US011995981B2

United States Patent
Hyvättinen et al.

(10) Patent No.: US 11,995,981 B2
(45) Date of Patent: May 28, 2024

(54) APPARATUS AND METHOD FOR SURFACE CONDITION MONITORING (71) Applicant: Vaisala Oyj, Vantaa (FI)

(72) Inventors: Timo Hyvättinen, Helsinki (FI); Kimmo Kynnös, Helsinki (FI); Samuli Laukkanen, Helsinki (FI); Joonas Kivi, Helsinki (FI)

(73) Assignee: Vaisala Oyj, Vantaa (FI)

( * ) Notice: Subject to any disclaimer, the term of this patent is extended or adjusted under 35 U.S.C. 154(b) by 0 days.

(21) Appl. No.: 17/066,508

(22) Filed: Oct. 9, 2020

(65) Prior Publication Data

US 2021/0192940 A1 Jun. 24, 2021

(30) Foreign Application Priority Data

Dec. 20, 2019 (EP) .................................... 19218411

(51) Int. Cl.
*G08G 1/01* (2006.01)
(52) U.S. Cl.
CPC ......... *G08G 1/0112* (2013.01); *G08G 1/0125* (2013.01); *G08G 1/0145* (2013.01)
(58) Field of Classification Search
CPC ... G08G 1/0112; G08G 1/0125; G08G 1/0145
See application file for complete search history.

(56) References Cited

U.S. PATENT DOCUMENTS

| 9,099,006 | B2 * | 8/2015 | Mudalige | B60W 10/20 |
| 9,108,640 | B2 | 8/2015 | Jackson | |
| 10,921,810 | B2 * | 2/2021 | Kutila | G08G 1/048 |
| 2019/0217864 | A1 | 7/2019 | Kusukame et al. | |

FOREIGN PATENT DOCUMENTS

EP 2983955 B1 6/2019
WO WO-2017189361 A1 * 11/2017

* cited by examiner

*Primary Examiner* — Aniss Chad
*Assistant Examiner* — Stephanie T Su
(74) *Attorney, Agent, or Firm* — Laine IP Oy (57) ABSTRACT According to an example aspect of the present invention, there is provided an apparatus comprising a normalized surface condition monitoring sensor, and a processing unit comprising at least one processing core, at least one memory including computer program code, the at least one memory and the computer program code being configured to, with the at least one processing core, cause the apparatus at least to process surface data based on a real time position of the apparatus to obtain calibration of the surface condition monitoring sensor, wherein values of the surface data originate from at least one normalized surface condition monitoring system, and wherein at least some of the values of the surface data are associated with position information.

7 Claims, 6 Drawing Sheets

APPARATUS AND METHOD FOR SURFACE CONDITION MONITORING

FIELD

The present invention relates to an apparatus. Certain embodiments of the present invention relate to an apparatus for road condition monitoring.

The present invention relates to a method. Certain embodiments of the present invention relate to a method for road condition monitoring.

Further, the present invention relates to a system such as a server.

Additionally, the present invention relates to a method carried out by the system.

BACKGROUND

Stationary or mobile remote surface condition monitoring systems, for example road condition monitoring systems, are typically based on a spectroscopic measurement principle. Said systems observe the hyperspectral colour change from contaminants. Knowledge of the measurement signal levels for a completely dry surface, for example signal levels for a completely dry road surface, form the foundation for this type of technology. In this document, said measurement signal levels for the completely dry surface will be called "dry reference levels" or "dry references".

Both the quality and age of the surface impact the dry reference levels and consequently the measurement accuracy. Stationary sensors can utilize dry references determined at the time of installation, and apply automatic corrections to take into account long-term changes of the surface. This is also called "automatic dry calibration".

Mobile measurements are, in contrast, carried out using moving vehicles. As a sensor routinely measures pavements of several qualities and ages, the representativeness of the dry calibration is a fundamental challenge in mobile measurements. The current solution to overcome the uncertainties is to use dry reference values for the most common pavement or a weighted average of different types in the geographic area of interest. Hence the dry reference and consequently the measurement results are suboptimal. The accuracy achieved by mobile remote sensors is lower than that of the same technology used in stationary installations as dry references are not known for each and every location.

In view of the foregoing, it would be beneficial to provide at least a mobile apparatus and a method for surface condition monitoring by means of which measurement result quality can be improved.

SUMMARY OF THE INVENTION

The invention is defined by the features of the independent claims. Some specific embodiments are defined in the dependent claims.

According to an aspect of the present invention, there is provided an apparatus comprising a normalized surface condition monitoring sensor, and a processing unit comprising at least one processing core, at least one memory including computer program code, the at least one memory and the computer program code being configured to, with the at least one processing core, cause the apparatus at least to process the surface data based on a real time position of the apparatus to obtain calibration of the surface condition monitoring sensor, wherein values of the surface data originate from at least one normalized surface condition monitoring system, and wherein at least some of the values of the surface data are associated with position information.

Various embodiments of the first aspect may comprise at least one feature from the following bulleted list:
- the normalized surface condition monitoring sensor is a road condition monitoring sensor
- the apparatus is configured to be attached to a vehicle
- the apparatus comprises a receiver configured to wirelessly receive surface data from a node
- the receiver is configured to receive signals from an external positioning system, for example a GPS satellite signal
- the receiver is configured to wirelessly receive dry references from the node, wherein values of the dry references originate from the at least one normalized surface condition monitoring system, and wherein at least some of the values of the dry references are associated with position information obtained by at least one first external positioning system
- the at least one memory and the computer program code being configured to, with the at least one processing core, cause the apparatus at least to process dry references based on a real time position of the apparatus to obtain continuous calibration of the surface condition monitoring sensor
- the apparatus comprises a transmitter for transmitting surface condition data and/or the real time position of the apparatus to the node
- the apparatus is configured to receive information about the real time position from the at least one first external positioning system or from at least one second external positioning system
- continuous or step-wise calibration is obtained
- the apparatus comprises a smartphone, a tablet or any other mobile computing device According to a second aspect of the present invention, there is provided a method comprising determining a real time position of a normalized surface condition monitoring sensor by at least one external positioning system, and processing surface data based on the real time position of the normalized surface condition monitoring sensor to obtain calibration of the surface condition monitoring sensor, wherein values of the surface data originate from at least one normalized surface condition monitoring system, and wherein at least some of the values of the surface data are associated with position information.

Various embodiments of the second aspect may comprise at least one feature from the following bulleted list:
- the position information is obtained by at least one first external positioning system, for example a GPS positioning system
- the real time position is obtained by at least one first external positioning system or at least one second positioning system
- the method further comprises receiving surface data from a node, wherein values of the surface data originate from at least one normalized surface condition monitoring system, and wherein at least some of the values of the surface data are associated with position information
- dry references are received from the node, wherein values of the dry references originate from at least one normalized surface condition monitoring system, and wherein at least some of the values of the dry references are associated with position information dry references are processed based on the real time position of the surface condition monitoring sensor to obtain continuous calibration of the surface condition monitoring sensor continuous or step-wise calibration is obtained According to a third aspect of the present invention, there is provided a system comprising a processing unit comprising at least one processing core, at least one memory including computer program code, the at least one memory and the computer program code being configured to, with the at least one processing core, cause the system at least to receive surface data from at least one normalized surface condition monitoring system, wherein at least some of the values of the surface data are associated with position information, store the received surface data in the at least one memory, and transmit at least a part of the stored surface data to an apparatus comprising a normalized surface condition monitoring sensor or to a node.

Various embodiments of the third aspect may comprise at least one feature from the following bulleted list:
- the position information is obtained by at least one first external positioning system
- the at least one memory and the computer program code being configured to, with the at least one processing core, cause the system at least to receive a real time position of the apparatus, and transmit at least a part of the stored data to the apparatus based on the real time position of the apparatus
- the system is configured to receive road weather station data and/or meteorological measurement data
- the system is configured to classify at least a part of the surface data as dry surface data forming dry references
- the system is configured to classify at least a part of the surface data as dry surface data forming dry references based on road weather station data and/or meteorological measurement data
- the system is configured to transmit dry references to the apparatus comprising the normalized surface condition monitoring sensor
- the system is a server or a computing device
- the system comprises a receiver
- the system comprises a transmitter
- the system serves as a node for an apparatus in accordance with any one of claims 1-7

According to a fourth aspect of the present invention, there is provided a method comprising receiving surface data from at least one normalized surface condition monitoring system, wherein at least some of the values of the surface data are associated with position information, storing the received surface data in at least one memory, and transmitting at least a part of the stored surface data to an apparatus comprising a normalized surface condition monitoring sensor or to a node.

Various embodiments of the fourth aspect may comprise at least one feature from the following bulleted list:
- the position information is obtained by at least one first external positioning system
- the method further comprising receiving a real time position of the apparatus, and transmitting at least a part of the stored data to the apparatus based on the real time position of the apparatus
- road weather station data and/or meteorological measurement data is received
- at least a part of the surface data is classified as dry surface data forming dry references
- at least a part of the surface data is classified as dry surface data forming dry references based on road weather station data and/or meteorological measurements
- dry references are transmitted to the apparatus comprising the normalized surface condition monitoring sensor Considerable advantages are obtained by means of certain embodiments of the present invention. An apparatus and a method for surface condition monitoring, in particular for road condition monitoring, are provided. Surface data previously obtained by at least one normalized surface condition monitoring system, typically previously obtained by a plurality of normalized surface condition monitoring systems, can be received from a node. The node may be, for example, a server, a computing device or the obtained surface data may be stored in the cloud. At least a part of the values of the surface data is linked to or associated with position information obtained by at least one first external positioning system. At least a part of the values of the surface data is classified as dry surface data forming "dry references", for example based on road weather station data or meteorological measurements. Thus, a dry reference map or database is created, for example a dry reference map of a road network is created. In other words, a specific dry reference is stored for every different location of the road network, for instance. At a later stage, the dry references can then be wirelessly received by the apparatus from the node and the dry references can be utilized to obtain calibration of a normalized road condition monitoring sensor comprised by the apparatus dependent on a real time position of the apparatus. In other words, the stored dry references can be used for automatic, real time and position dependent calibration of the normalized road condition monitoring sensor, thus improving measurement results as dry references are known for each location.

According to a further embodiment, there is provided an apparatus comprising a normalized surface condition monitoring sensor and a memory having stored surface data thereon. For example, surface data of several runways of an airport may be stored. Values of the surface data of the runways originate from at least one normalized surface condition monitoring system and the values of the surface data are associated with position information. The apparatus is configured to process the stored surface data based on a real time position of the apparatus to obtain calibration of the surface condition monitoring sensor. According to this embodiment, surface data is not continuously received from a server.

According to an even further embodiment, a system and a method for receiving, storing and transmitting surface condition data are provided. A geographic map or a database of dry references and road qualities can be created from the mobile measurement data. The stored dry reference map can be continuously updated and used by the sensors of normalized road condition monitoring systems of different manufacturers in real time. Within a short period of time, a comprehensive dry reference map can be automatically created and mobile measurements can be corrected utilizing correct dry references for each measured spot yielding the same accuracy as similar technology has in stationary installations.

According to another embodiment, the surface data previously obtained by at least one normalized surface condition monitoring system is received and stored by a server and then transmitted to a further node. The transmitted data may then be used by an operator, for instance.

EMBODIMENTS

Figure 1:
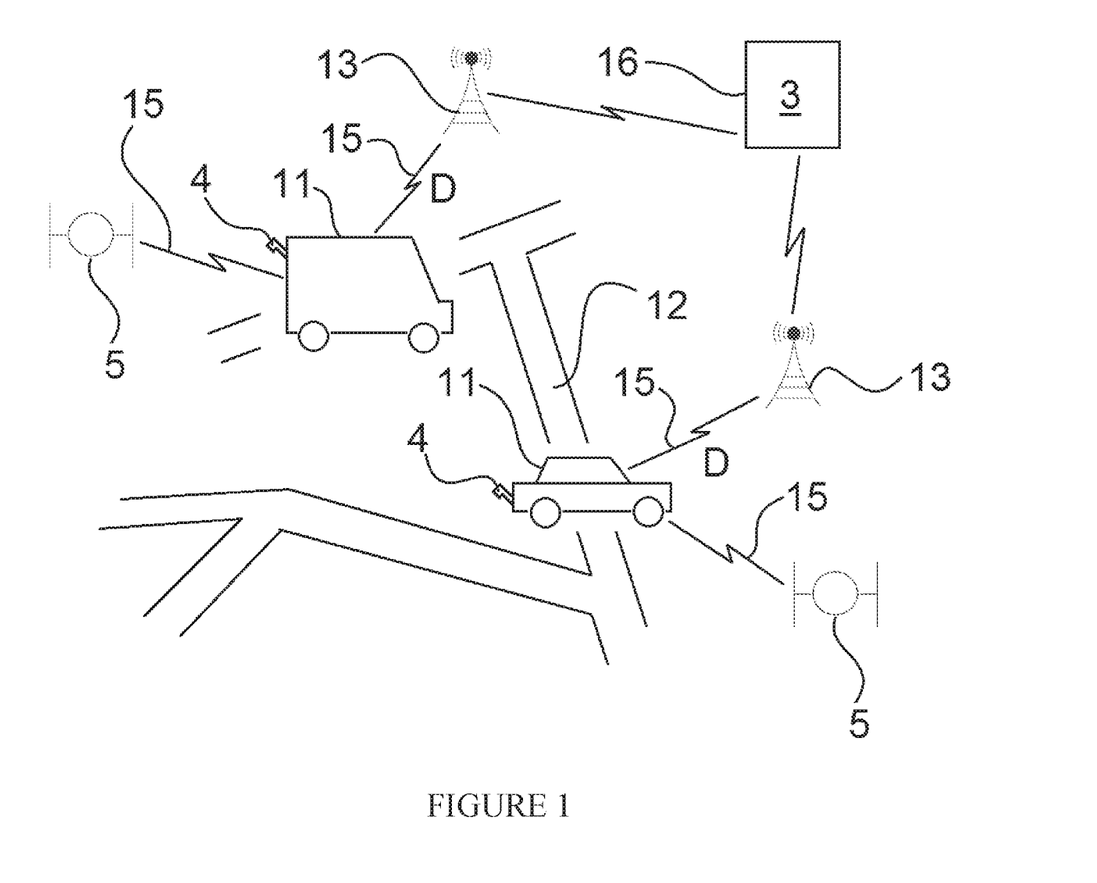
FIG. 1 illustrates a schematic view of a road network.

In FIG. 1 a schematic view of a road network is illustrated. A plurality of vehicles 11 is moving along roads 12 of the road network. A normalized surface condition monitoring system 4 is attached to each vehicle 11. The normalized surface condition monitoring systems may be manufactured by the same or different manufacturers. Further, the normalized surface condition monitoring systems may be attached to the vehicles 11 at different heights above the road surface. Due to the normalization sensors attached to a vehicle 11 at a different installation height and/or different sensors provide commensurable signal levels. In other words, normalization of the surface condition monitoring systems 4 is required in order to provide comparability and/or reproducibility of measurements of different sensors or differently positioned sensors.

The term "normalized surface condition monitoring system" in this document means that signals received by the sensor are brought to the same signal level after installation of the system and prior to measurement of surface data D. This may be, for example, performed utilizing a white reference plate to be placed on the ground. For normalization signals of the reference plate are used to scale measured signals, for example by division of true signal level/reference plate signal level.

Surface data D is measured by the normalized surface monitoring systems 4 while the vehicles are moving along the roads 12 of the road network. Additionally, position information obtained from at least one first external positioning system 5, for example a GPS positioning system, is received. Consequently, values of the surface data D can be linked to or associated with position information. The surface data D linked to or associated with position information can then be wirelessly transmitted from each vehicle 11 via a network node 13 to a node 3 via air interface 15. The node 3 may be, for example, a server 16 capable of storing the received surface data D linked to or associated with position information.

Road weather station data and meteorological measurements can be, for example, used in connection with the mobile measurements in order to contribute to this data set of historical measurement values. In particular, the road weather station data and meteorological measurements can be used together with the mobile measurements to confirm data sets under dry conditions, for instance. It may also be possible to develop algorithms that are similar to the current auto-calibration algorithms of a fixed unit. In other words, values of the surface data D received by the server 16 may be classified as dry surface data forming dry references based on road weather station data and/or meteorological measurements.

A geographic map or a database of dry references and road qualities can thus be created from the mobile measurement data. At least one mobile normalized road condition monitoring system 4 is required for obtaining the surface data D received by the node 3. Typically, the database is created utilizing several mobile normalized road condition monitoring systems 4 as illustrated in FIG. 1. However, the collected information is not necessarily limited to dry references only, but rather several parameters relevant to the measurement, such as surface structure and quality of the pavement or the road in general may be transmitted to the node 3.

Of course, the mobile normalized road condition measurement systems can benefit from the data set of historical measurement values. In particular, the mobile normalized road condition measurement systems can utilize the stored dry references and other data depending on the real-time location of the road condition measurement sensors. This solution eliminates the performance issues on different types of pavements. From the data set of measurements from which it is possible to estimate location dependent dry references it is possible to create a live dry reference map, which can be continuously updated and used by the sensors in real time. Within a short period of time, a comprehensive dry reference map can be automatically created and mobile measurements can be corrected utilizing correct dry references for each measured spot yielding the same accuracy as similar technology has in stationary installations.

Figure 2:
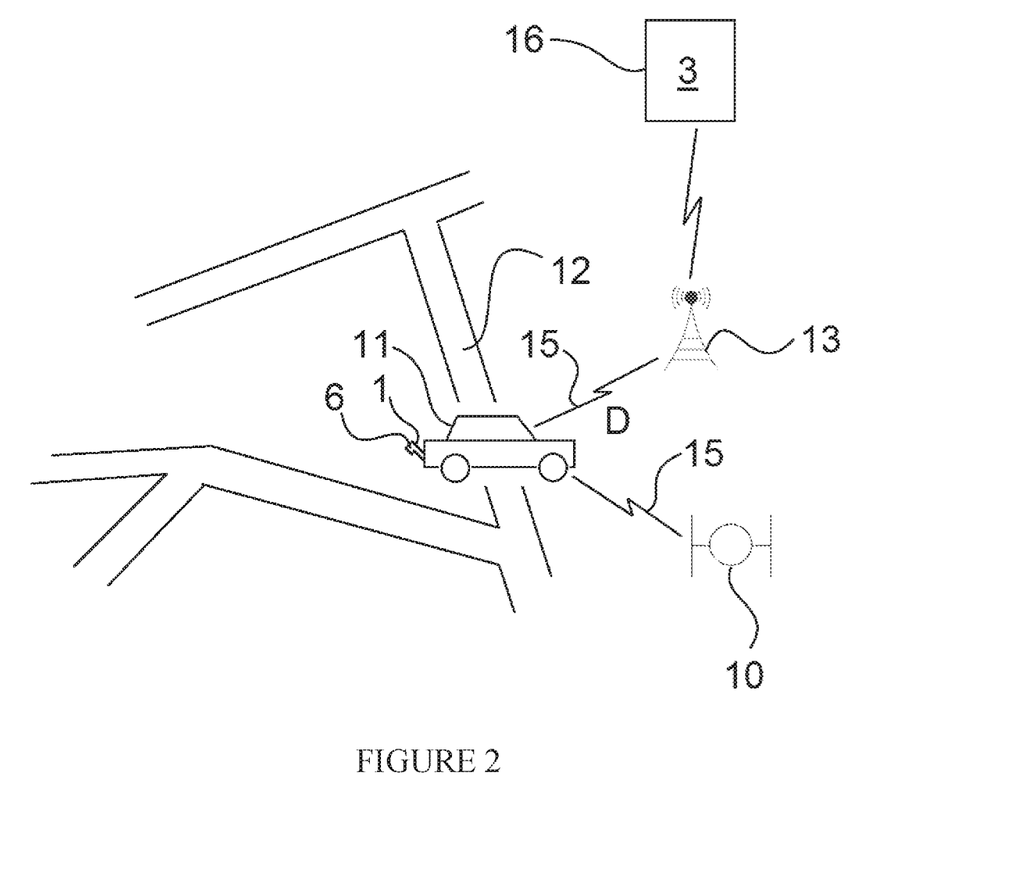
FIG. 2 illustrates a schematic view of an apparatus in accordance with at least some embodiments of the present invention.

In FIG. 2 a schematic view of an apparatus 1 in accordance with at least some embodiments of the present invention is illustrated. There may be a wireless communication system. The wireless communication system may comprise a server 16, a wireless network node 13 and the apparatus 1. The apparatus 1 may communicate with the server 16 via air interface 15.

The apparatus 1 comprises a receiver configured to wirelessly receive surface data D from a node 3. The node 3 may be the server 16, for instance. Values of the surface data D stored in the server 16 have been previously obtained by at least one normalized surface condition monitoring system (not shown) as described above in connection with FIG. 1. At least some of the values of the surface data D are linked to or associated with position information previously obtained by at least one first external positioning system.

The apparatus 1 further comprises a normalized surface condition monitoring sensor 6 attached to a vehicle 11. The normalized surface condition monitoring sensor may be, for example, comprised by a road condition monitoring system. The normalized surface condition monitoring sensor 6 is not necessarily the sensor of the normalized surface condition monitoring system 4 shown in FIG. 1. However, in some cases the same sensor is meant in this document.

Additionally, the apparatus 1 comprises a processing unit comprising at least one processing core and at least one second memory including computer program code. The at least one second memory and the computer program code are configured to, with the at least one processing core, cause the apparatus 1 at least to process surface data D received from the node 3 based on a real time position of the apparatus 1 to obtain continuous calibration of the normalized surface condition monitoring sensor 6. The surface data D received from the server 16 typically includes dry references. Information about the real time position of the apparatus 1 may be received from the at least one first external positioning system or from at least one second external positioning system 10. In other words, dry references linked to or associated with position information can be wirelessly received from the node 3 by the apparatus 1 and the dry references can then be utilized to obtain continuous calibration of the normalized surface condition sensor 6 based on a real time position of the apparatus 1.

According to certain embodiments, the term "real time position" in this document may also include a delay of up to 10 seconds, i.e. the position of the apparatus 1 may have already changed when the surface data D associated with a specific position information received from the node 3 and corresponding to the real time position is processed. However, it is considered that a 10 second delay still provides sufficient data to obtain calibration of the surface condition sensor 6. According to certain embodiments, the delay is 3 seconds or less. According to certain other embodiments, the delay is 5 seconds or less.

Figure 3:
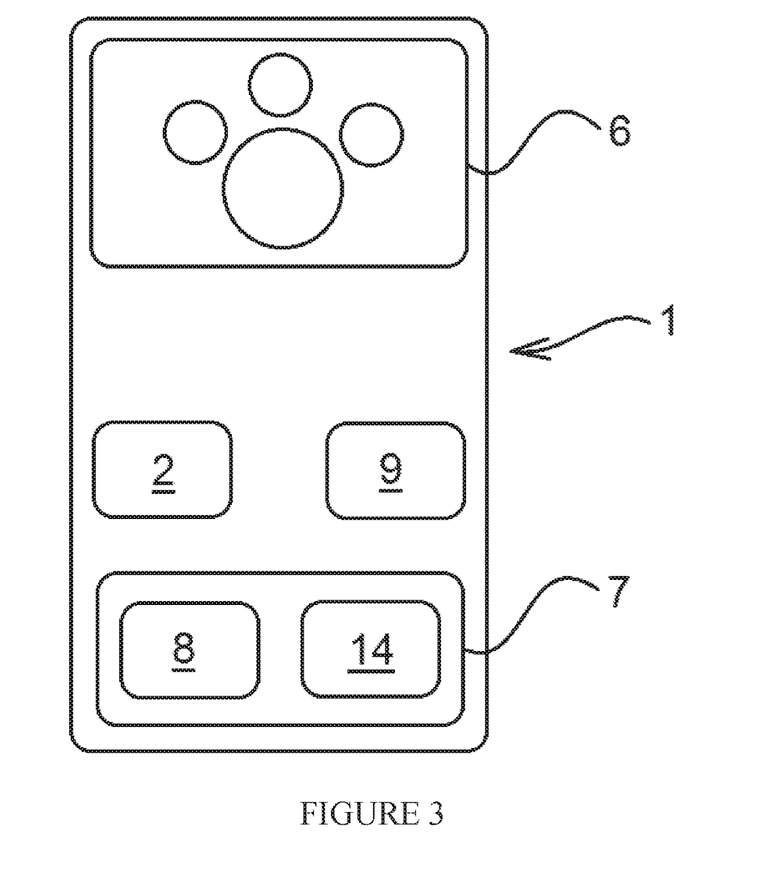
FIG. 3 illustrates a schematic view of another apparatus in accordance with at least some embodiments of the present invention.

In FIG. 3 a schematic view of another apparatus 1 in accordance with at least some embodiments of the present invention is illustrated. The apparatus 1 may be a road condition monitoring device.

The apparatus 1 comprises a receiver 2 configured to wirelessly receive surface data from a node (not shown). Values of the surface data have been previously obtained by at least one normalized surface condition monitoring system (not shown), i.e. originate from the at least one normalized surface condition monitoring system. The values of the surface data are linked to or associated with position information previously obtained by at least one first external positioning system (not shown). Additionally, the apparatus 1 may further comprise a transmitter 9 for transmitting data, for example road condition data. The transmitter 9 and the receiver 2 may be configured to transmit and receive, respectively, information in accordance with at least one communication standard. The transmitter 9 may comprise more than one transmitter. The receiver 2 may comprise more than one receiver. The transmitter 9 and/or the receiver 2 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example. The receiver 2 is configured to receive signals from an external positioning system, for example a GPS satellite signal.

The apparatus 1 further comprises a normalized surface condition monitoring sensor 6. The normalized surface condition monitoring sensor 6 is typically an optical system such as a spectroscopic device. The normalized surface condition monitoring sensor 6 may, for example, comprise two or three transmitters for transmission of laser beams and one receiver for receiving an optical spectrum.

Additionally, the apparatus 1 comprises a processing unit 7 comprising at least one processing core 8 and at least one memory 14 including computer program code. A processing core may comprise, for example, a Cortex-A8 processing core manufactured by ARM Holdings or a Steamroller processing core produced by Advanced Micro Devices Corporation. Processing unit 7 may comprise at least one Qualcomm Snapdragon and/or Intel Atom processor, for instance. Processing unit 7 may be means for performing method steps in apparatus 1. Processing unit 7 may be configured, at least in part by computer instructions, to perform actions.

The processing unit 7 may be furnished with a transmitter arranged to output information from processing unit 7, via electrical leads internal to apparatus 1, to other systems comprised in apparatus 1. Such a transmitter may comprise a serial bus transmitter arranged to, for example, output information via at least one electrical lead to the at least one memory 14 for storage therein. Alternatively to a serial bus, the transmitter may comprise a parallel bus transmitter. Likewise processing unit 7 may comprise a receiver arranged to receive information in processing unit 7, via electrical leads internal to apparatus 1, from other systems comprised in apparatus 1. Such a receiver may comprise a serial bus receiver arranged to, for example, receive information via at least one electrical lead from receiver for processing in processing unit 7. Alternatively to a serial bus, the receiver may comprise a parallel bus receiver.

The at least one memory 14 may comprise random-access memory and/or permanent memory. The at least one memory 14 may comprise at least one RAM chip. The at least one memory 14 may comprise solid-state, magnetic, and/or optical memory, for example. The at least one memory 14 may be at least in part accessible to processing core 8. The at least one memory 14 may be at least in part comprised in processing unit 7. The at least one memory 14 may be means for storing information, for example road condition information, position information and/or dry references. The at least one memory 14 may comprise computer instructions that processing core 8 is configured to execute. When computer instructions configured to cause processing core 8 to perform certain actions stored in the at least one memory 14, and apparatus 1 overall is configured to run under the direction of processing core 8 using computer instructions from the at least one memory 14, processing unit 7 and/or its at least one processing core 8 may be considered to be configured to perform said certain actions. The at least one memory 14 may be at least in part external to apparatus 1 but accessible to apparatus 1.

The at least one memory 14 and the computer program code are configured to, with the at least one processing core 8, cause the apparatus 1 at least to process surface data received from the node based on a real time position of the apparatus 1 to obtain continuous or step-wise calibration of the normalized surface condition monitoring sensor 6.

The processing core 8, the at least one second memory 14, transmitter 9, receiver 2, normalized surface condition monitoring sensor 6, readout circuitry and/or an user interface may be interconnected by electrical leads internal to apparatus 1 in a multitude of different ways. For example, each of the aforementioned systems may be separately connected to a master bus internal to apparatus 1, to allow for the systems to exchange information. However, as the skilled person will appreciate, this is only one example and depending on the embodiment various ways of interconnecting at least two of the aforementioned systems may be selected without departing from the scope of the present invention.

Figure 4:
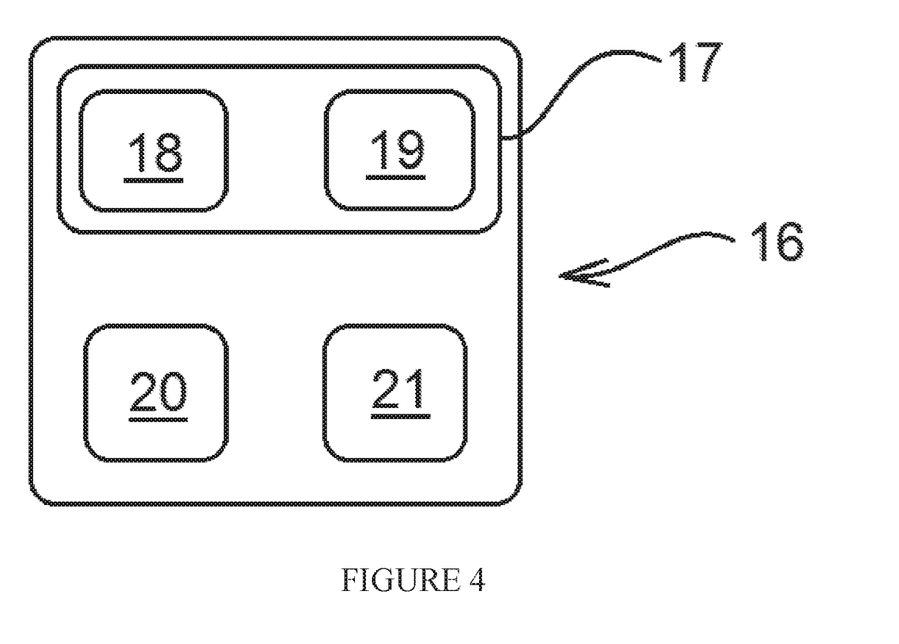
FIG. 4 illustrates a schematic view of a system in accordance with at least some embodiments of the present invention.

In FIG. 4 a schematic view of a system in accordance with at least some embodiments of the present invention is illustrated. The system may be, for example, a server 16. The system comprises a processing unit 17 comprising at least one processing core 18 and at least one memory 19 including computer program code. The at least one memory 19 and the computer program code are configured to, with the at least one processing core 18, cause the system 16 at least to receive surface data from at least one normalized surface condition monitoring system, wherein at least some of the values of the surface data are associated with position information. The position information may be obtained by at least one first external positioning system, for example a GPS positioning system. The at least one memory 19 and the computer program code are further configured to, with the at least one processing core 18, cause the system 16 at least to store the received surface data in the at least one memory 19 and to transmit at least a part of the stored surface data to an apparatus comprising a normalized surface condition monitoring sensor, for example to an apparatus 1 as described in connection with FIG. 2 or FIG. 3.

The system may be configured to receive information about a real time position of the apparatus 1. Transmission of at least a part of the stored surface data to the apparatus 1 may then take place based on the real time position of the apparatus.

The system may be further configured to receive road weather station data and/or meteorological measurement data and such data may be stored in the at least one memory 19 of the system, for instance. The system may be configured to classify at least a part of the surface data as dry surface data forming dry references. Classification may take place based on the road weather station data and/or meteorological measurement data, for instance. Classification is typically carried out electronically utilizing a classification algorithm. Of course, the system is configured to transmit the dry references to the apparatus 1 comprising the normalized surface condition monitoring sensor. Such dry references linked to or associated with position information are useful in order to obtain automatic, real time and position dependent calibration of a normalized surface condition monitoring sensor.

Figure 5:
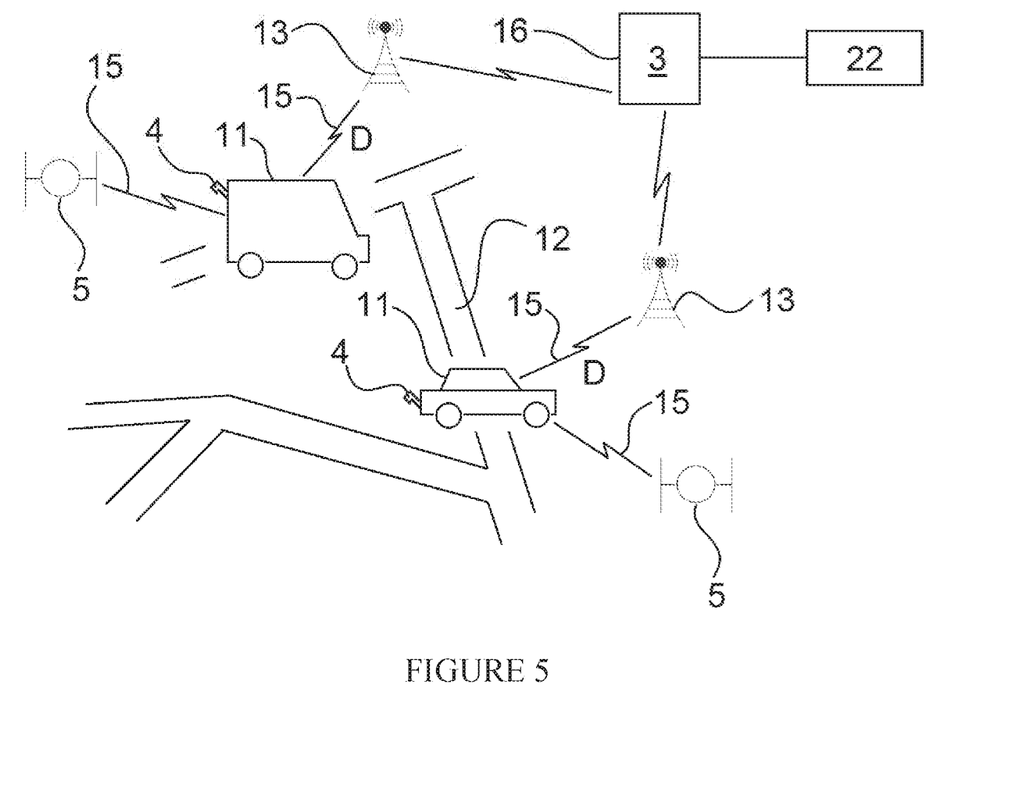
FIG. 5 illustrates a schematic view of another system in accordance with at least some embodiments of the present invention.

In FIG. 5 a schematic view of another system in accordance with at least some embodiments of the present invention is illustrated. The system 16 comprises elements or components as shown in connection with the system of FIG. 4. According to this embodiment, the at least one memory and the computer program code are configured to, with the at least one processing core, cause the system 16 at least to receive surface data D from one or more normalized surface condition monitoring system(s) 4, wherein at least some of the values of the surface data D are associated with position information obtained by at least one first external positioning system 5, to store the received surface data D in the at least one memory, and to transmit at least a part of the stored surface data D to a (second) node 22. In other words, the surface data D is not transmitted to a normalized surface condition monitoring sensor, but instead the surface data D is transmitted to the node 22. An operator, for example, may then read-out the surface data D for further processing.

Figure 6:
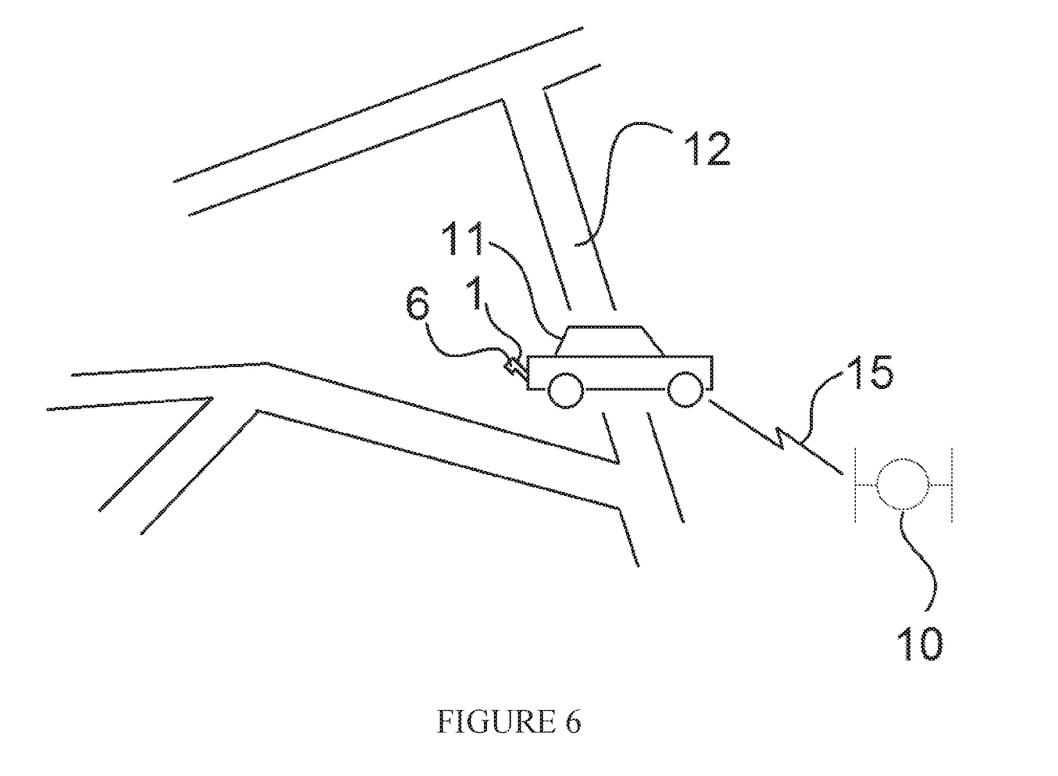
FIG. 6 illustrates a schematic view of an even further apparatus in accordance with at least some embodiments of the present invention.

In FIG. 6 a schematic view of an even further apparatus in accordance with at least some embodiments of the present invention is illustrated. The apparatus comprises a normalized surface condition monitoring sensor 6. Additionally, the apparatus comprises a processing unit comprising at least one processing core and at least one memory including computer program code. The apparatus may comprise a device such as a smartphone, a tablet or any other computing device. The processing unit and the memory may be comprised by said device. The device may be connected wirelessly or by electric wiring to the normalized surface condition monitoring sensor 6. The at least one memory and the computer program code are configured to, with the at least one processing core, cause the apparatus at least to process surface data D based on a real time position of the apparatus to obtain calibration of the surface condition monitoring sensor 6. Values of the surface data D originate from at least one normalized surface condition monitoring system (not shown) and are stored in the memory of the apparatus. At least some of the values of the surface data D are associated with position information.

For example, surface data of several runways of an airport may be stored in the memory. Surface data for a specific runway may be used in order to obtain calibration of the normalized surface condition monitoring system 6 based on the real time position of the apparatus. The real time position may be retrieved from an external positioning system 10 or by input from a user via a user interface of the apparatus. The real time position is not necessarily retrieved continuously. According to this embodiment, a specific surface data set for one specific runway may be processed and considered as real time position data as long as the apparatus is located on this specific runway. The surface data D may comprise dry references required for calibration of the normalized surface condition monitoring sensor 6 as long as the apparatus is located on the specific runway. Another specific surface data set may be temporarily selected when the apparatus is located on another runway of the airport.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in carrying out road condition measurements.

REFERENCE SIGNS LIST 1 apparatus
2 receiver
3 node
4 normalized surface condition monitoring system
5 first external positioning system
6 surface condition monitoring sensor
7 processing unit
8 processing core
9 transmitter
10 second external positioning system
11 vehicle
12 road
13 network node
14 memory
15 air interface
16 system
17 processing unit
18 processing core
19 memory
20 transmitter
21 receiver
22 second node
D surface data

The invention claimed is:

1. An apparatus comprising:
a normalized surface condition monitoring sensor configured to be attached to a vehicle,
a receiver configured to wirelessly receive dry references for different locations from a node, wherein values of the dry references originate from at least one normalized surface condition monitoring system, and wherein at least some of the values of the dry references are associated with position information obtained by at least one first external positioning system, and
a processing unit comprising at least one processing core, at least one memory including computer program code, the at least one memory and the computer program code being configured to, with the at least one processing core, cause the apparatus at least to:
store specific dry references received by the receiver for every different location in a dry reference map, and
process the stored specific dry references, based on a real time position of the apparatus to obtain position dependent continuous calibration of the surface condition monitoring sensor.

2. The apparatus according to claim 1, wherein the normalized surface condition monitoring sensor is a road condition monitoring sensor.

3. The apparatus according to claim 1, wherein the apparatus is configured to be attached to a vehicle.

4. The apparatus according to claim 1, further comprising a transmitter for transmitting surface condition data and/or the real time position of the apparatus to the node.

5. The apparatus according to claim 1, wherein the receiver is configured to wirelessly receive dry references from a server.

6. The apparatus according to claim 1, wherein:
continuously updating and using the dry reference map by the normalized surface condition monitoring sensor.

7. A method comprising:
receiving dry references for different locations from a node, wherein values of the dry references originate from at least one normalized surface condition monitoring system, and wherein at least some of the values of the dry references are associated with position information obtained by at least one first positioning system,
storing specific dry references received by the receiver for every different location in a dry reference map,
determining a real time position of a normalized surface condition monitoring sensor attached to a vehicle by at least one second external positioning system, and
processing the stored specific dry references based on the real time position of the normalized surface condition monitoring sensor to obtain position dependent continuous calibration of the surface condition monitoring sensor.

* * * * *